United States Patent [19]

Nilsson

[11] Patent Number: 5,370,771
[45] Date of Patent: Dec. 6, 1994

[54] PROCESS FOR RECOVERING ENERGY AND CHEMICALS FROM SPENT LIQUOR USING LOW FREQUENCY SOUND

[75] Inventor: Bengt Nilsson, Skoghall, Sweden
[73] Assignee: Chemrec Aktiebolag, Karlstad, Sweden
[21] Appl. No.: 854,754
[22] Filed: Mar. 20, 1992

Related U.S. Application Data

[63] Continuation of Ser. No. 642,446, Jan. 17, 1991, abandoned.

[30] Foreign Application Priority Data

Feb. 7, 1990 [SE] Sweden .................. 9000434

[51] Int. Cl.$^5$ .................................. D21C 11/12
[52] U.S. Cl. .................... 162/30.1; 162/30.11; 162/50; 431/1; 431/186
[58] Field of Search ........... 162/30.1, 30.11, 50; 431/1, 183, 186; 423/DIG. 3

[56] References Cited

U.S. PATENT DOCUMENTS

| | | | |
|---|---|---|---|
| 4,501,205 | 2/1985 | Funk | 110/347 |
| 4,650,413 | 3/1987 | Olsson et al. | 431/1 |
| 4,808,264 | 2/1989 | Kignell | 162/30.1 |
| 5,059,404 | 10/1991 | Mansour et al. | 423/201 |

FOREIGN PATENT DOCUMENTS

458799 5/1989 Sweden .

OTHER PUBLICATIONS

"Perry's Chemical Engineers's Handbook"; Sixth Edition; pp. 9-38 and 9-39.

*Primary Examiner*—Steve Alvo
*Attorney, Agent, or Firm*—Cushman, Darby & Cushman

[57] ABSTRACT

A process and reactor for recovering energy and chemicals from spent liquor obtained in pulp production by thermal decomposing the spent liquor are described, said decomposing being carried out in a reactor at a pressure of from atmospheric pressure up to 150 bar and at a temperature of 500°–1500° C. so that a gas and solid and/or molten inorganic material are formed, said gas being rich in energy to be used as fuel or being useful as raw material for chemical production. According to the invention the thermal decomposition of the spent liquor is carried out during exposure to low frequency sound and without or with simultaneously supply of oxygen or a gas containing oxygen in an amount below that stoichiometrically required for complete oxidation of the substances formed at the thermal decomposition. The reactor comprises at least one sound generator arranged to generate low frequency sound in the reactor.

12 Claims, 1 Drawing Sheet

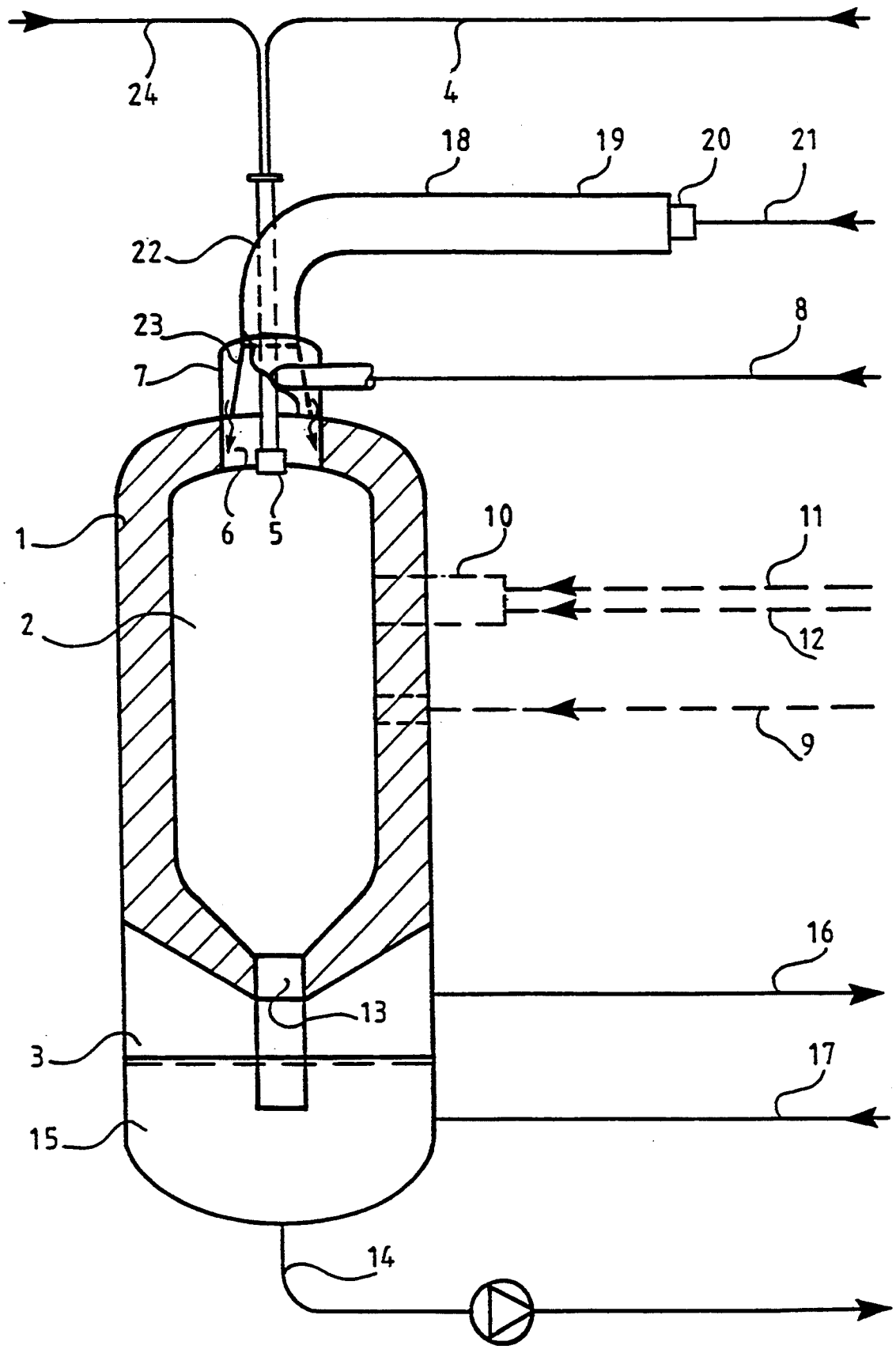

PROCESS FOR RECOVERING ENERGY AND CHEMICALS FROM SPENT LIQUOR USING LOW FREQUENCY SOUND

This is a continuation of application Ser. No. 07/642,446, filed on Jan. 17, 1991 now abandoned.

FIELD AND BACKGROUND OF THE INVENTION

The present invention relates to a process for recovering energy and chemicals from spent liquor obtained in pulp production and to a reactor for carrying out this process.

Burning fossil fuels such as coal, oil and natural gas constitutes an alternative to nuclear power for producing heat. The alternatives also include biomass fuels, in particular the combustion of spent liquors obtained from the cellulose industry. Two objectives are aimed at when burning spent liquors from the sulphate pulp industry, the first being that the organic wood substance is combusted so that its heat of combustion is converted to useful thermal energy, and the second being that the inorganic chemicals in the spent liquor are recovered and converted to active form. Under-stoichiometric condition is required when the sulphur is to be recovered in sulphide form, while at the same time the recovery of energy requires over-stoichiometric condition. Two opposing processes are thus required to take place simultaneously within a common space, which results in optimization problems when using traditional soda recovery boiler technique. Hitherto one has tried to solve the problem by using various process levels in the soda recovery boiler in which under-stoichiometric condition prevail in the bottom and over-stoichiometric condition in the upper part. Optimization problems of the soda recovery boiler include inter alia that the chemicals recovered from e.g. sulphate pulp production contain a certain amount of oxidized sulphur in the form of sodium sulphate, sodium sulphite and sodium thiosulphate. This is due to difficulties in maintaining controlled conditions in the bottom region of the boiler. Besides this, a certain amount of dust is also emitted from the bottom region of the boiler. The dust contains sodium and sulphur which are oxidized higher up in the soda recovery boiler, forming sodium sulphate which is separated out and returned to the chemical cycle. The oxidized sulphur is chemically inactive in the pulping process and thus constitutes a ballast in the chemical cycle.

U.S. Pat. No. 4,808,264 (corresponding to SE 448 173) describes a process constituting an alternative to the soda recovery boiler process and based on a gasification technique. The organic substances of the black liquor are gasified in a first step to produce substantially CO, $CO_2$, $H_2$ and $H_2S$ in a pressurized reactor by means of so called "flash-pyrolysis", whereby the remainder obtained consists substantially of the inorganic components of the spent liquor in solid or molten form. In such a gasification of organic material a portion of residual carbon is normally obtained, the quantity of residual carbon being dependent upon several factors such as the reaction temperature, air/fuel-ratio and fuel injection technique. The gas obtained from gasification is conveyed further for cleaning and can then be used as fuel. Since the gasification is carried out during addition of oxidation air, nitrogen is also supplied. Nitrogen constitutes ballast and the amount of oxidation air should therefore be minimized. However, if gasification is carried out at under-stoichiometric conditions a carbon residue ("char") is very easily formed. Technically, the design of the apparatus and process for the known reactor is essential in particular with respect to thermodynamic conditions such as reaction time, temperature, turbulence and material atomization so that as large a reaction surface as possible is formed. The low air/fuel-ratio also causes particular difficulties in maintaining high turbulence in the reaction zone as compared with a complete combustion process. Flow conditions with formation of laminar films of oxidation air around the particles easily occur and optimization of the parameters mentioned above becomes a very difficult task. At higher pressure in the gasification chamber the density of the gas increases, thus causing further limitations of the turbulence in the gasification chamber. Temperature and the oxidation or reaction processes will therefore vary.

The conditions for optimizing a combustion process and those for optimizing a gasification process are thus significantly different. This is particularly so when the gasification process comprises several steps, i.e. chemical recovery which is very difficult to optimize, besides the actual gasification of organic material.

SE 458 799 describes combustion of fluid fuels dispersed in combustion air and subjected to low frequency sound. Combustion of fuel occurs necessarily in excess of air and thus differs essentially from a thermal decomposition process in which the material is thermally decomposed with a limited supply of air (gasification) or without supply of air (pyrolysis). This patent specification neither reveals nor suggests the use of low frequency sound in such a substantially different technique as the recovery of energy and chemicals by means of such a substantially different process as an endothermal decomposition process with its specific optimization problems.

SUMMARY OF THE INVENTION

The object of the present invention is to improve known thermal decomposition techniques so that the reaction processes are intensified and optimum conditions are achieved for the recovery process.

This object is obtained by the process according to the present invention for recovering energy and chemicals from spent liquor obtained in pulp preparation. The process comprises thermally decomposing the spent liquor in a reactor at a pressure of from atmospheric pressure up to about 150 bar and at a temperature of about 500°–1500° C. so that a gas and solid and/or molten inorganic material are formed, said gas being rich in energy to be used as fuel or being useful as raw material for chemical production, said thermal decomposition of the spent liquor being carried out during exposure to low frequency sound and without or with simultaneously supply of oxygen or a gas containing oxygen in an amount below that stoichiometrically required for complete oxidation of the substances formed at the thermal decomposition.

The invention facilitates a recovery process with extremely high demands on a high level of process optimization. The process according to the invention enables (a) control of the temperature and degree of gasification or decomposition independent of each other, (b) advanced macro and micro turbulences which constantly create new reaction surfaces, (c) intensification of the slowest reaction step, viz. final oxidation of the residual coke, (d) maximum carbon conversion, (e) maximum sulphur-reduction efficiency, (f) production of gas with the highest possible energy content for combustion purposes, and (g) pressurizing of the reactor from 1–150 bar (absolute), preferably 20–40 bar (absolute), while still retaining good operation performance.

BRIEF DESCRIPTION OF THE DRAWING

The invention will be described further in the following, with reference to the accompanying drawing showing schematically one embodiment of a gasification reactor for carrying out the process according to the invention.

DESCRIPTION OF ILLUSTRATED EMBODIMENT

In the drawing the reference numeral 1 designates a vertical gasification reactor comprising a brick-lined gasification chamber 2 and a cooling chamber 3 located below it. A conduit 4 for the supply of spent liquor is connected to the top of the reactor 1, the inlet 5 thereof being located inside the gasification chamber. An atomizing medium such as steam or gas, e.g. air, is supplied through a conduit 24 which is combined with the spent liquor conduit 4 so that it terminates with its orifice at the same point as the conduit 4. The reactor 1 is provided with a top opening 6 which is closed by an upwardly protruding portion 7 through which said spent liquor conduit 4 extends. A conduit 8 for the supply of gas, such as oxygen, oxygen-containing gas or returned combustion gas, is connected tangentially to the casing of portion 7. This gas may suitably be pre-heated to a predetermined high temperature, e.g. the operation temperature of the reactor 1. Oxygen or oxygen-containing gas may also be supplied through a second conduit 9 connected to the gasification chamber 2 at a point located a predetermined distance from the inlet 5, preferably in the middle of the gasification chamber 2. A burner 10 is also connected to the gasification chamber 2 at a point located a predetermined distance from the inlet 5, the burner 10 being supplied with air or other oxygen-containing gas through a conduit 11. The burner 10 may be supplied with fuel through a conduit 12. This fuel may consist of returned combustion gas, for instance. Alternatively, or supplementary thereto, some of the energy-rich gas produced in the gasification chamber 2 may be utilized as fuel gas to support the endothermal decomposition. The gasification chamber 2 has an outlet 13 ending in the cooling chamber 3. A conduit 14 for discharging green liquor 15 produced is connected to the bottom of the reactor 1, and a conduit 16 for discharging fuel gas produced is connected to the reactor 1 at a point within the cooling chamber 3 located above the liquid level therein. A conduit 17 is also connected to the bottom portion of the reactor 1 for the addition of liquid and circulation of green liquor.

According to the present invention the reactor 1 also includes a sound generator means 18 which generates and maintains a low frequency sound in the gasification chamber 2 so that the atomized spent liquor injected through inlet 5, the gas present, and the decomposed substances are subjected to the influence of low frequency sound. In the embodiment shown, said sound generator comprises a tubular resonator 19, the length of which is suitably one fourth of the wave length of the sound generated, and a supply unit 20 disposed at one end of the resonator 19 and forming a low frequency generator. The supply unit 20 is connected to a conduit 21 for the supply of propellant gas, such as air. The generator may consist of an infra-sound generator, e.g. of the type described in U.S. Pat. No. 4 593 962. However, any type of low frequency sound generator means can be used for the purpose of the invention inclusive generation of pulsations of low frequency sound. The resonator 19 describes a 90° bend 22 and terminates in a diffusor 23 which, together with the bend 22, is included in the quarter wave generator. The diffusor 23 is located inside and is surrounded by the casing of said portion 7. If desired the reactor 1 may be provided with several sound generators supplying low frequency sound at different points in the gasification chamber 2.

The high reflection ability of the infra-sound enables a large space to be filled with sound from a single infra-sound generator. No sound shadows occur and the sound level remains unchanged and occurs simultaneously in all parts of the gasification chamber. The reactor 1 includes control equipment (not shown) which maintains the entire system—resonance tube and gasification chamber—in resonance even when the operating conditions change, such as e.g. at a change in temperature and pressure. The infra-sound oscillates the gas and the solid particles finely dispersed therein, and cyclic alterations in the gas—compressions and decompressions—enable a considerable increase in the contact between the finely dispersed particles or droplets of material and the surrounding gas due to the well developed turbulence, macro as well as micro turbulence, resulting from the influence of the low frequency sound. New attack points are thus constantly opened up for chemical reactions. The exposure of the gasification process to low frequency sound enables temperature and degree of gasification to be controlled independently of each other.

The low frequency sound generator may be located at other locations than that shown, e.g. at the side walls or at the bottom of the gasification chamber 2.

When processing sulphate spent liquors obtained in the cellulose industry, for instance, both the organic and inorganic substances must be recovered, viz. both the wood lignin released during sulphate digestion and also digestion chemicals in the form of sodium and sulphur compounds. The sulphur shall be recovered in sulphide form and the process requires extreme under-stoichiometric (reducing) conditions within a temperature range which depends on the method used for gasifying the spent liquor. There are presently the dry method operating within the temperature range 500°–800° C., resulting in that the sodium substantially forms $Na_2CO_3$ in solid form and that the sulphur forms $H_2S$ in the gas produced; the melt method operating within the temperature range 800°–1000° C., resulting in the formation of molten droplets of $Na_2CO_3$ and $Na_2S$ and a gas containing minor amounts of $H_2S$; and the causticizing-free melt method operating within the temperature range 1000°–1500° C. and resulting in direct conversion of inorganic material to active digestion chemicals in the form of $Na_2S$ and $NaOH$. The chemicals recovered are re-used in the pulp production process and the gas produced can be utilized for energy production. The gas produced can also be used as raw material in the chemical industry, e.g. in the production of ammonia, methanol and synthetic natural gas.

The use of low frequency sound or pulsations thereof gives essential improvements in the gasification system described. This is due to improved material transport through laminar boundaries caused by the low frequency sound or pulsations thereof produced in any way. The path of the oxygen molecule into the molten droplet with its carbon content constitutes a transport phenomenon and high turbulence is required, which is achieved by the process according to the invention. The slowest step in the gasification process is the final oxidation of the residual coke. This step is controlled by the transport of oxygen and steam molecules through the laminar gas layer surrounding the droplets. Reactants in the gas phase must thus pass into the glowing coke particle through the cloud of gas surrounding it. The degree of carbon conversion is therefore improved by means of the thermodynamic described.

The thermal decomposition takes place in the apparatus described above during controlled supply of oxygen or a gas containing oxygen in an amount below that stoichiometrically required for complete oxidation of the substances formed at the thermal decomposition. This amount corresponds to about 20–80%, preferably about 30–60% of that stoichiometrically required for complete oxidation. The provision that the supply of oxygen is lower than that stoichiometrically required ensures that reducing conditions will prevail during the gasification and that therefore no essential amounts of oxidized sulphur will be produced in the form of sodium sulphate, sodium sulphite and sodium thiosulphate.

Alternatively the thermal decomposition may be performed as a pure pyrolysis, i.e. without the addition of air.

The invention is applicable to spent liquors obtained from both sulphate and sulphite digestion processes.

That which is claimed is:

1. A process for recovering energy and chemicals from spent liquor obtained in pulp production, said process comprising using a reactor having a recess and a base in a wall of a gasification chamber, said reactor containing a low frequency sound source containing a diffuser located in said recess and opening on said wall of said recess and a supply inlet conduit for spent liquor and an atomizing medium with said supply inlet conduit having a delivery end, said supply inlet conduit extending through said recess and locating said delivery end inside said reactor gasification chamber, said recess having a selected diameter and said delivery end having a diameter smaller than said selected diameter, passing the spent liquor and the atomizing medium through said supply inlet conduit delivery end and into the gasification chamber and atomizing the spent liquor with the atomizing medium, generating low frequency sound through the diffuser to all parts of the gasification chamber, thermally decomposing the atomized spent liquor endothermically in said gasification chamber at a pressure of from atmospheric pressure up to about 150 bar and at a temperature of about 500°–1500° C., thereby forming at least one gas inorganic material byproduct, said gas byproduct being rich in energy to be used as fuel and as raw material for chemical production, said thermal decomposition of the atomized spent liquor being carried out during the exposure to the low frequency sound, and simultaneously supplying oxygen during the thermal decomposition in an amount below that stoichiometrically required for complete oxidation of the substances formed during the thermal decomposition.

2. A process as recited in claim 1 wherein the spent liquor comprises waste products containing sodium and sulphur from the manufacture of sulphate pulp.

3. A process as recited in claim 1 wherein the spent liquor comprises waste products from the manufacture of sulphite pulp.

4. A process as recited in claim 1 wherein the low frequency sound has a frequency of at most 150 Hz.

5. A process as recited in claim 4 wherein the low frequency sound has a frequency of at most 40 Hz.

6. A process as recited in claim 5 wherein the low frequency sound has a frequency of at most 20 Hz.

7. A process as recited in claim 1 wherein oxygen or oxygen-containing gas is supplied in an amount corresponding to between about 20–80% of the amount stoichiometrically required for complete oxidation.

8. A process as recited in claim 1 wherein the low frequency sound is introduced into the reactor close to the location at which the spent liquor is introduced.

9. A process as recited in claim 1 wherein the low frequency sound is generated by at least one sound generator means.

10. A process as recited in claim 1 wherein oxygen is supplied in an amount corresponding to between 30–60% of the amount stoichiometrically required for complete oxidation.

11. A process as recited in claim 1 wherein the low frequency sound has a frequency of at most 40 Hz.

12. A process as recited in claim 11 wherein the low frequency sound has a frequency of at most 20 Hz.

* * * * *